United States Patent [19]

Kamejima et al.

[11] Patent Number: 4,628,453
[45] Date of Patent: Dec. 9, 1986

[54] NAVIGATION APPARATUS FOR MOBILE SYSTEM

[75] Inventors: Kohji Kamejima; Yuji Hosoda, both of Ibaraki; Yoshiyuki Nakano, Hitachi; Masakatsu Fujie, Ibaraki; Taro Iwamoto, Mito; Kazuo Honma; Takashi Yoshida, both of Ibaraki, all of Japan

[73] Assignee: Hitachi, Ltd., Tokyo, Japan

[21] Appl. No.: 655,541

[22] Filed: Sep. 28, 1984

[30] Foreign Application Priority Data

Oct. 17, 1983 [JP] Japan .................................. 58-192353

[51] Int. Cl.⁴ .............................................. G06F 15/50
[52] U.S. Cl. ..................................... 364/424; 358/103; 180/168
[58] Field of Search ............... 364/424, 444, 449, 451; 180/167-169; 318/587; 358/103; 73/178 R; 340/988

[56] References Cited

U.S. PATENT DOCUMENTS

| 3,925,641 | 12/1975 | Kashio | 340/988 |
| 4,278,142 | 7/1981 | Kuno | 358/103 |
| 4,328,545 | 5/1982 | Halsall et al. | 364/424 |
| 4,500,970 | 2/1985 | Daemmer | 364/444 |
| 4,541,049 | 9/1985 | Ahlbom | 364/424 |

OTHER PUBLICATIONS

"Manipulator Vehicles of the Nuclear Emergency Brigade in the Federal Republic of Germany" by Köhler et al., published in proceedings of 24th Conference on Remote Systems Technology, 1976; pp. 196-218.

Primary Examiner—Gary Chin
Attorney, Agent, or Firm—Antonelli, Terry & Wands

[57] ABSTRACT

In a navigation apparatus for guiding a mobile system along a predetermined path, an image obtained by measuring an actual environment is compared with a predicted image stored in advance, and a guidance signal is delivered to the mobile system on the basis of the comparison of the images.

8 Claims, 7 Drawing Figures

NAVIGATION APPARATUS FOR MOBILE SYSTEM

BACKGROUND OF THE INVENTION

The present invention relates to a navigation apparatus for mobile systems such as robots, and more particularly to a navigation apparatus which can move a mobile system to a destination by understanding the surroundings and can adapt itself to the environment.

Many robots presently are used in well-ordered environments such as factories. In recent years, however, a robot usable even in environments other than well-ordered environments has been required. In order to realize this requirement, the robot needs to be given an intelligence function and a movement function. Through the movement function, the robot can have its working limits extended and can also be moved to a place of adverse environmental conditions. For these reasons, various moving mechanisms which can travel over unlevel ground, a staircase, etc. have recently been proposed.

Meanwhile, with enhancement in the movement function, a navigation apparatus has been required which autonomously guides a robot to a desired destination. As an example of such a navigation apparatus, there is a system which employs an observed image information for guidance information (Proceedings of the 24th conference on remote systems technology, 1976, pp. 196–218). This navigation apparatus employing image information is such that an image obtained with a television camera or the like is processed to extract the feature points of the image, a determination of the three-dimensional arrangement of an object including directions, distances etc. is computed on the basis of the arrangement of the feature points, and the distance to the object is detected on the basis of the computation so as to derive a guidance signal which includes steering, speed etc. and with which the mobile system is guided.

With a navigation apparatus of this type, the processing of a large quantity of image information is involved, and a considerable period of time is needed for computing each processing step. Therefore, in guiding the mobile system at high speed, only some of the image information successively received can be utilized, so that the mobile system cannot be guided with high precision. Moreover, in the foregoing navigation apparatus, respective images are treated as being independent in the image processing as described above. Therefore, unintentional movement of the image ascribable to vibrations etc. has a direct influence in extracting a guidance signal for the mobile system, with the result that an exact guidance signal cannot be obtained.

For such reasons, the prior-art navigation apparatus has been used under a well-ordered situation in which vibrations hardly develop or a situation in which a fixed target object can be always utilized or a recognition pattern is employed. Moreover, it has been necessary to run the mobile system at low speed so that the surroundings can be sufficiently recognized. Consequently, the aforementioned navigation apparatus is unsuited for application to a mobile system which moves at high speed in general environments.

SUMMARY OF THE INVENTION

The present invention has been made in view of the above drawbacks, and has for its object to provide a navigation apparatus which can move and guide a mobile system at high speed in general environments.

The present invention for accomplishing the object consists, in a navigation apparatus for guiding a mobile system along a predetermined path, of means to detect a path movement of the mobile system, memory means to deliver a predictive pattern measurable at a particular position on the basis of positional information of the mobile system detected by the detection means, vision means to measure an actual environment and to detect an actual image thereof, at least one image processor which extracts an observed feature pattern from the observed image obtained with the vision means, and guidance control means to compare the observed feature pattern from the image processor with the predicted pattern and to deliver a guidance signal for the mobile system.

Other objects, advantages and features of the present invention will become apparent from the following description of embodiments.

DETAILED DESCRIPTION OF THE PREFERRED EMBODIMENTS

Embodiments of the present invention will be described below with reference to the drawings.

Figure 1:
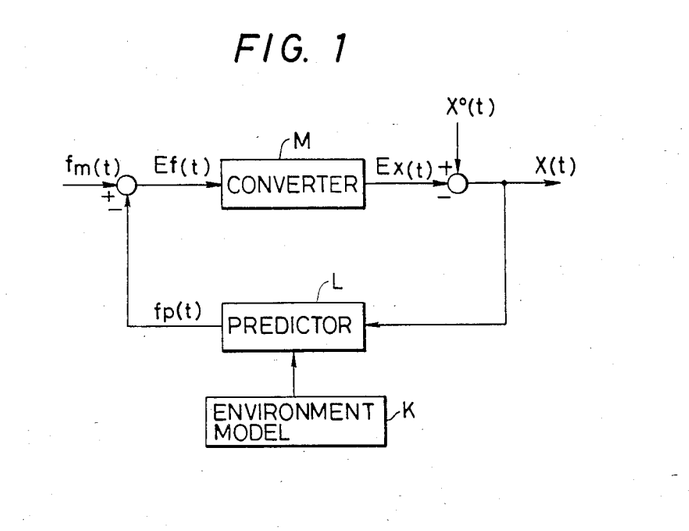
FIG. 1 is a block diagram for explaining the principle of the present invention.

First, the principle of the present invention will be explained before presenting a description of the embodiments of the present invention. The navigation apparatus of the present invention computes a guidance signal for a mobile system by estimating the position of the mobile system on the basis of an image derived by means of a camera carried on the mobile system, under the premise that information representative of an environment model and a moving path have been already provided. An algorithm for producing the guidance signal will be explained more in detail. As illustrated in FIG. 1, the pre-estimated value $X°$ of the current position of the mobile system is determined on the basis of the rotational magnitude, the steering magnitude etc. of the driving motor of the mobile system. Subsequently, a prediction image $f_p$ corresponding to the pre-estimated value is generated using environment model information K and a predictor L. Thereafter, the predicted image $f_p$ and a measured image $f_m$ are compared to find their image error $E_f$, which a converter M converts into a position error $E_x$, on the basis of which the pre-estimated value $X°$ is compensated to obtain an estimated positional value X. The mobile system is guided to a desired path on the basis of the estimated positional value X. Information for bringing the current position of the mobile system into agreement with the present path is available as the residual $E_x$ of the position estimation throughout the sampling of the television camera.

According to the present invention, in the comparison between the predicted image $f_p$ and the observed image $f_m$ for the positional error conversion in the operating flow of obtaining the guidance signal stated above, dynamic position estimation means if employed which is acquired by introducing a dynamical model between the patterns of these images.

Figure 2:
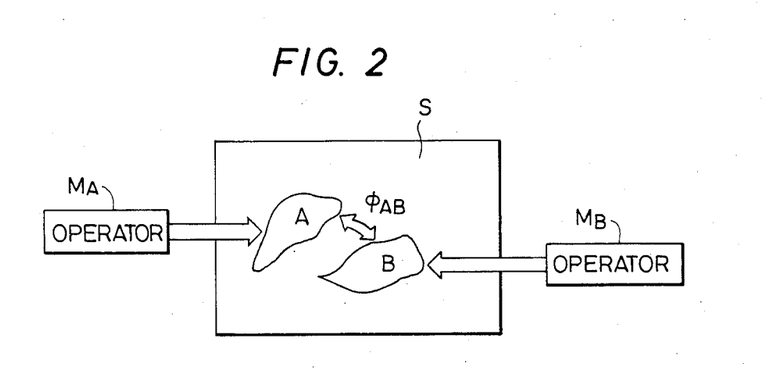
FIG. 2 is a diagram for explaining the operation of the principle of the present invention.

As illustrated in FIG. 2, the position estimation means is such that a pattern A and a pattern B are arranged within the same space S and that these patterns A and B are provided with respective operators $M_A$ and $M_B$, either or both of which is/are manipulated to move the pattern/patterns so as to decrease the interaction $\phi_{AB}$ between the patterns A and B, whereby the pattern matching is dynamically executed.

Next, the aforementioned interaction $\phi_{AB}$ between the patterns will be explained.

Hereunder, in order to simplify the explanation, it is assumed as illustrated in FIG. 2 that the space S is a image screen and that the patterns A and B are binary images. Here, the pattern A is assumed to be a pattern based on the measured image, while the pattern B is assumed to be a pattern based on the predicted image produced in accordance with the environment model K. Now, when the pattern A has been derived, an adaptation rule for translating the position of the pattern B to the pattern A needs to be found. This adaptation rule is obtained by introducing a potential $\phi_A$ which is established on the space S by the pattern A. The potential $\phi_A$ can be evaluated by the following equation (1):

$$a\phi_A + X_A = 0 \tag{1}$$

Here, $a$ denotes a differential operator expressed by $$\sigma_x \cdot \frac{\partial^2}{\partial x^2} + \sigma_y \cdot \frac{\partial^2}{\partial y^2} \cdot \sigma_x$$

and $\sigma_y$ are parameters which express the spatial spread of the potential $\phi_A$. In addition, in Equation (1), $X_A$ is a characteristic function in the case of regarding the pattern A as a subset of the space A.

Next, a force $F_B$ to which the pattern B is subjected by the field of the potential $\phi_A$ of the pattern A on the space S described above can be evaluated by the following equation (2). Here, in order to facilitate the explanation, only movements in the directions of x- and y-axes within a two-dimensional plane are considered.

$$F_B = \int_S X_B \cdot D\phi_A \, ds \tag{2}$$

Here, $X_B$ denotes as characteristic function in the case of regarding the pattern B as being identical to a subset of the space S, and D a gradient operator, namely, a differential operator of $$\left( \sigma_x \cdot \frac{\partial}{\partial x}, \sigma_y \cdot \frac{\partial}{\partial y} \right)'.$$

Information for transforming the pattern B relative to the pattern A, that is, the guidance information of the mobile system can be obtained with the aforementioned equations (1) and (2). Since, however, Equation (1) in the computation includes simultaneous equations of an infinite dimensional equation, the following equation of approximation (3) should favorably be used:

$$\frac{\partial \phi_A}{\partial t} = a\phi_A + X_A \tag{3}$$

The output $U_B$ of the operator $M_B$ for moving the pattern B toward the pattern A by the use of the solution of the potential $\phi_A$ of the above equation (3) can be evaluated by the following equation (4):

$$U_B = - \int_S X_B \cdot D\phi_A \, ds \tag{4}$$

A pattern matching mechanism derived from the aforementioned equations (3) and (4) can be put into hardware by the use of an image memory and two regional arithmetic units.

On the basis of the principle of the present invention thus far described, an embodiment of the navigation apparatus of the present invention will be described with reference to FIG. 3. In this figure, a mobile system 1 which is guided by the navigation apparatus of the present invention includes a vehicle mechanism 1A such as wheels or treads and can move in a desired direction by means of a steering mechanism (not shown). The mobile system 1 includes a gyroscope 1B for detecting azimuth and a detector or rotary encoder 1C for detecting the rotational magnitude of the vehicle mechanism 1A, which provide information for predicting the position of the mobile system itself. In addition, the mobile system 1 includes a television camera 2 by which a scene in front of the mobile system is deleted as image information.

The navigation apparatus of the present invention for guiding the mobile system 1 comprises a location detector 3 which detects the location of the mobile system 1 in the path thereof on the basis of information signals delivered from the gyroscope 1B and the rotary encoder 1C; a memory 4 which stores estimative feature patterns of the environment which are estimated from the locations of the mobile system delivered from the location detector 3, for example, the linear patterns of the group of parallel lines of a staircase, the border between a corridor and a wall, a window, etc. within a building, and path information within the building; an image processor 5 by which an observed image from the television camera 2 is processed into a plurality of feature patterns at the same time, while a feature pattern effective for a comparison is extracted; a comparator 6 which studies the coincidence between the effective observed feature pattern from the image processor 5 and the predictive characteristic pattern from the memory 4; and a guidance controller 7 which computes a guidance signal for the mobile system 1 in accordance with the result of the comparison of the comparator 6 between the observed feature pattern and the predicted feature pattern and which delivers the guidance signal to the mobile system 1. The guidance signal of the guidance controller 7 moves the mobile system 1 along the target path as stated above, and is also used as a signal for the position control of the mobile system. As referred to above, the guidance controller 7 comprises a potential computer 7A which computes the field of the potential $\phi_A$ acting between the predicted pattern and the observed pattern, and a matching force evaluator 7B which computes the gradient vector of the force $F_B$ of the observed pattern acting on the predicted pattern, the force being produced by the field of the potential $\phi_A$. The computative contents of these arithmetic units 7A and 7B are executed in accordance with the foregoing principle of the present invention.

Figure 4:
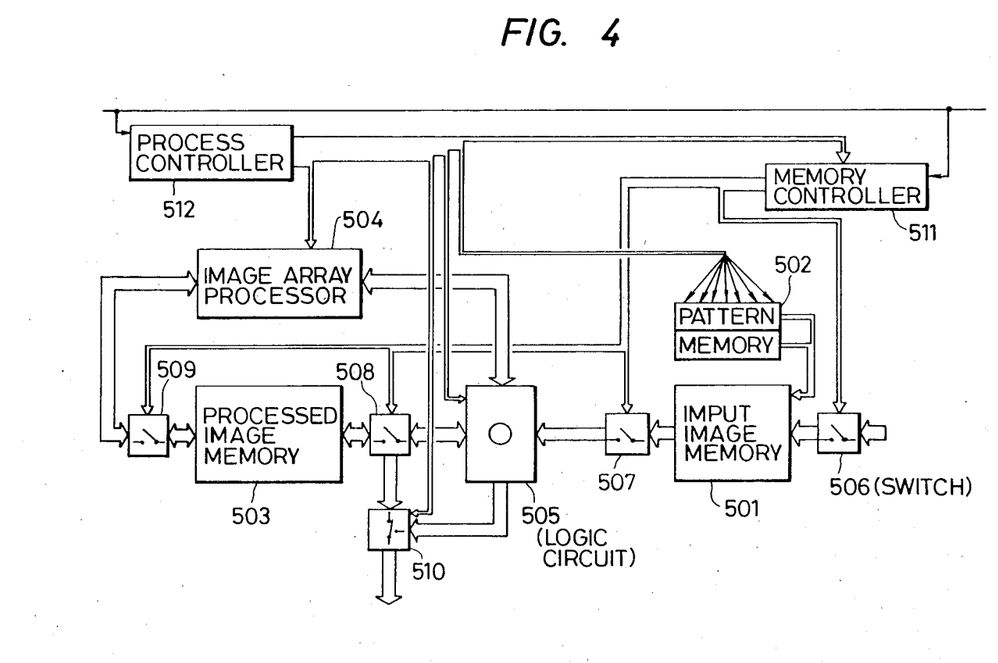
FIG. 4 is a diagram showing the arrangement of an example of an image processor which constitutes the apparatus of the present invention.

As shown in FIG. 4, the image processor 5 described above comprises an input image memory 501 which writes an input image therein; a pattern memory 502 which controls a write address for the input image memory 501, a processed image memory 503 which stores a processed image; an image array processor 504 which computes a compensation value that compensates for the gradation value of each of the picture elements of a given image on the basis of the gradation values of nearby picture elements; a hardware logic circuit 505 which executes a calculation for the data of a word length corresponding to the larger one of the gradation values of the picture elements of the input image memory 501 and the processed image memory 503; switches 506-509 which selectively deliver the values of the input image memory 501, processed image memory 503 and hardware logic circuit 505; a memory controller 511 which controls the switches 506-509; and a process controller 512 which controls the memory controller 511, pattern memory 502, hardware logic circuit 505, image array processor 504 and a switch 510. A plurality of such image processors 5 are disposed in order to extract a plurality of observed feature patterns from the input image, namely, the measured image at the same time.

This image processor 5 can store the input image into the input image memory 501 by controlling the write address of the input image memory 501 by means of the pattern memory 502 as stated above. Therefore, it does not require any conversion computation, and it can execute the correction of a distortion, the conversion of an orientation, etc. in real time in response to the image input signal. On this occasion, the content of the pattern memory 502 can be converted and set by the process controller 512. In addition, owing to the image array processor 504 and the hardware logic circuit 505 which are controlled by the process controller 512, this image processor 5 can be switched and used so as to have the functions of the potential computer 7A and the matching force evaluator 7B mentioned above.

Next, there will be explained operations for guiding the mobile system 1 by the use of the foregoing embodiment of the navigation apparatus of the present invention.

Figure 3:
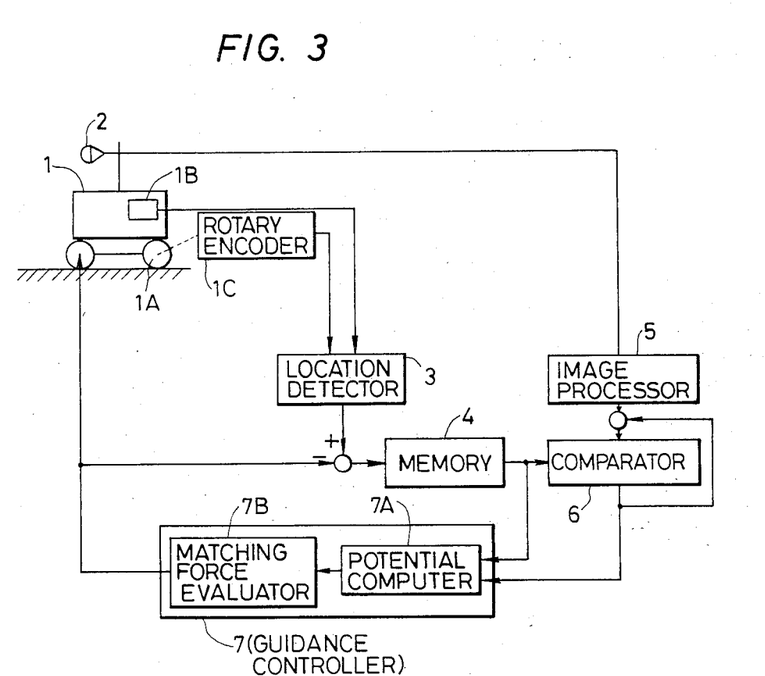
FIG. 3 is a diagram showing the arrangement of one embodiment of the navigation apparatus of the present invention.
Figure 5:
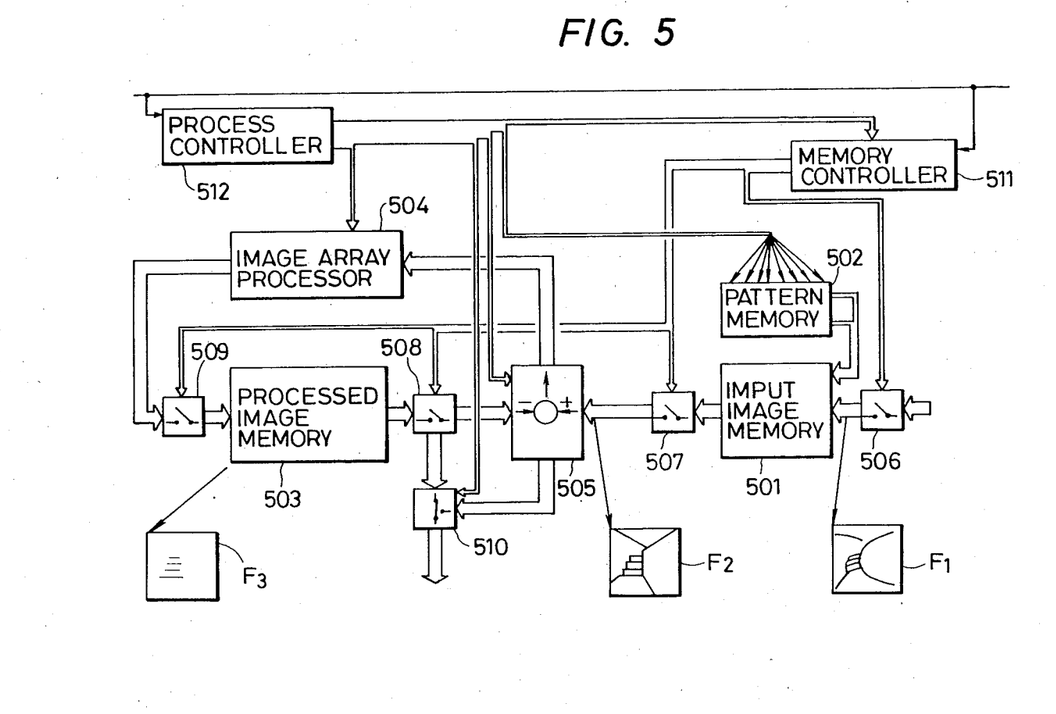
FIG. 5 is a diagram showing the operations of the image processor.

Now, consider a case where the mobile system 1 shown in FIG. 3 moves toward a staircase located in front thereof. At this time, the television camera 2 photographs the staircase and delivers the image signal f thereof to each image processor 5. On this occasion, as illustrated in FIG. 5, the pattern memory 502 in the image processor 5 is set at a distorted pattern memory in which the aberration correction data of the lens of the television camera 2 are written, the image array processor 504 is set at an operation parameter corresponding to diffusion in a horizontal direction, and the hardware logic circuit 505 is controlled so as to perform the subtraction of picture elements. Owing to this setting, in a case where a staircase image $F_1$ having distortions as shown in FIG. 5 has been received as an input, the information $F_1$ of the distorted staircase image $F_1$ is stored in the input image memory 501 as the information of a staircase image $F_2$ free from the distortions. The distortionless staircase image $F_2$ is processed into, for example, a horizontal line image $F_3$ corresponding to the steps of the staircase by means of the hardware logic circuit 505 as well as the image array processor 504. The horizontal line image $F_3$ is stored in the processed image memory 503. The information of the stored horizontal line image $F_3$ is delivered to the potential computer 7A of the guidance controller 7 by the switches 508 and 510.

Figure 6:
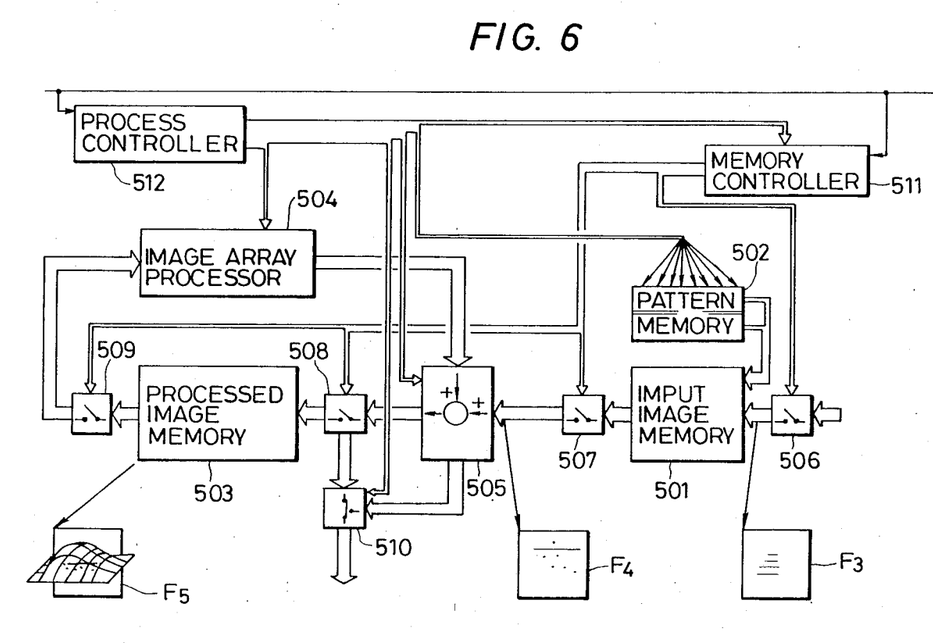
FIG. 6 is a diagram showing the arrangement of an example of a potential computer which constitutes the apparatus of the present invention.

It has been explained above that the potential computer 7A can be implemented by the same arrangement as that of the image processor 5 shown in FIG. 4. Therefore, a circuit in FIG. 6 is treated as the arrangement of the potential computer 7A. In this case, the pattern memory 502 is set so as to perform the function of enlarging the specified region of the image information from the image processor 5 into the size of the whole screen, namely, the curving-out function. In addition, the image array processor 504 has its operation parameter set at isotropic diffusion. Further, the hardware logic circuit 505 is set at an addition mode. Under this state, the information of the horizontal line image $F_3$ from the image processor 5 shown in FIG. 5 has, for example, only the information $F_4$ of one horizontal line stored into the input image memory 501 by the pattern memory 502 which is set at curving-out. This information $F_4$ is added in the hardware logic circuit 505 with an operation signal having the isotropic diffusion from the image array processor 504, to be converted into the information $F_5$ of a potential field which serves as one indicator of approach to the recognized information $F_4$. This information $F_5$ of the potential field is stored into the processed image memory 503, while it is delivered via the switch 510 to the matching force evaluator 7B connected therewith.

Figure 7:
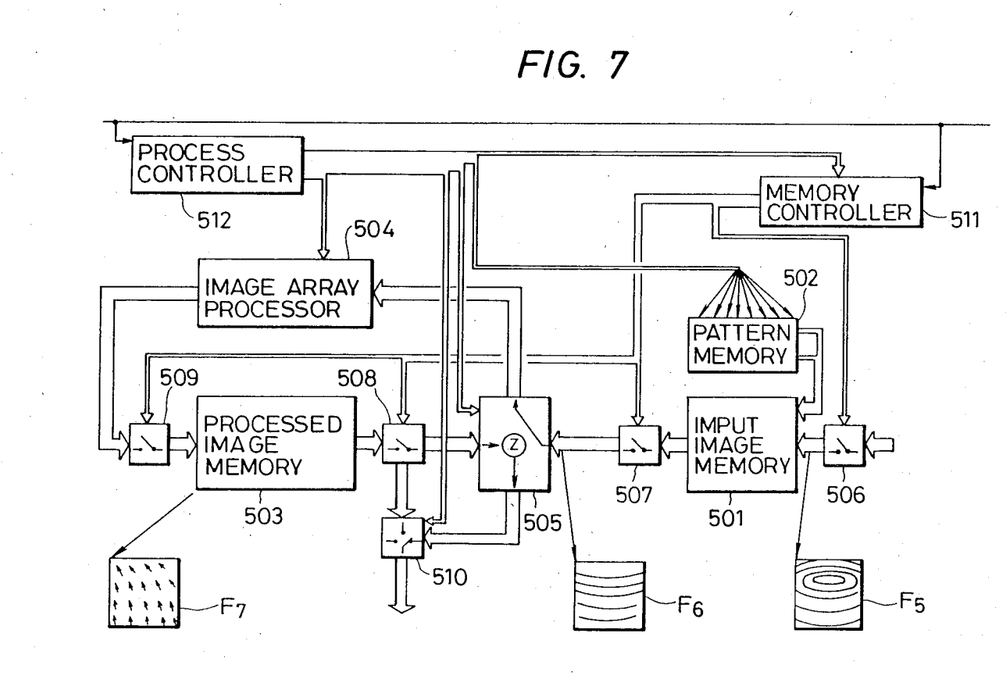
FIG. 7 is a diagram showing the arrangement of an example of a matching force evaluator which constitutes the apparatus of the present invention.

Likewise to the potential computer 7A thus far described, the matching force evaluator 7B can be realized by the same arrangement as that of the image processor 5 shown in FIG. 4. The operations of the matching force evaluator 7B will be explained with reference to FIG. 7. In this case, the pattern memory 502 is set at a curvingout pattern memory, the image array processor 504 is set at an operation parameter for computing a gradient in a matching force, and the hardware logic circuit 505 is set at an integration mode. Under this state, the information $F_5$ of the potential field from the potential computer 7A has only a partial information $F_6$ thereof extracted by the pattern memory 502, whereupon the extracted information is stored into the input image memory 501. This information $F_6$ is applied to the image array processor 504 through the hardware logic circuit 505. Here, the information $F_6$ is processed into the information $F_7$ of a gradient field which expresses the elements of the matching force. The information $F_7$ of the gradient field denotes a movement deviation relative to the preset moving path of the mobile system 1. In other words, it denotes the position and sense to and in which the mobile system 1 ought to advance relative to the set moving path. This information $F_7$ of the gradient field is stored into the processed image memory 503, while it is delivered as the guidance signal of the mobile system 1 to this mobile system 1 shown in FIG. 3 through the switch 510. The guidance signal controls the steering mechanism of the mobile system 1.

Thus, the mobile system 1 is guided along the predetermined path and can move toward its destination. Besides, the guidance signal is compared with the predicted location value of the mobile system from the mobile-system location predictor 3 so as to compensate for various errors involved in the running of the mobile system in the actual environment, for example, a running distance error caused by a slip, an uneven path surface or the like, and a steering error attributed to the unbalance of right and left motors or the drift of the gyroscope, and also to correct positional and directional errors at the point of time at which the running starts.

According to the foregoing embodiment, the observed image obtained with the television camera has a plurality of feature patterns extracted at the same time by the image processors, and the best recognized one of the patterns is used as the index of navigation, so that navigation of high precision is possible. Furthermore, information which expresses the deviation between the observed feature pattern and a predicted feature pattern is detected in real time by the guidance controller 7.

While, in the foregoing embodiment, coincidence between the observed feature pattern and the predicted feature pattern has been examined by the comparator 6 in order to enhance navigability, the present invention can be performed without employing the comparator 6.

As described above in detail, according to the present invention, a mobile system can be moved at high speed in a wide range of general environments. In addition, it is possible to attain intelligence for autonomously navigating a mobile system.

What is claimed is:

1. A navigation apparatus for guiding a mobile system along a predetermined path comprising means to detect a path movement of the mobile system, memory means to store three-dimensional predictive patterns relating to positional information of the mobile system, vision means to observe an actual environment and to detect an actual image thereof, image processing means to extract an observed feature pattern from the observed image obtained with said vision means, and guidance control means to compare the observed feature pattern from said image processing means and the predicted pattern delivered from said memory means in accordance with the positional information of the mobile system and to provide a guidance signal for the mobile system as an output.

2. A navigation apparatus as defined in claim 1, wherein said memory means stores predictive pattern information on the basis of environment models and moving paths in and along which the mobile system moves.

3. A navigation apparatus as defined in claim 2, wherein said means to detect path movement of the mobile system comprises a rotary encoder which detects a rotational magnitude of a vehicle mechanism of the mobile system, and a gyroscope which detects a direction of the mobile system.

4. A navigation apparatus as defined in claim 3, wherein said image processing means comprises a plurality of image processors which extract a plurality of feature patterns from the observed image at the same time.

5. A navigation apparatus as defined in claim 4, wherein said guidance control means comprises a potential computer which computes a potential based upon the observed feature pattern.

6. A navigation apparatus as defined in claim 5, wherein said guidance control means comprises a matching force evaluator which evaluates a matching force to which the predicted pattern is subjected by said potential.

7. A navigation apparatus as defined in claim 4, wherein said guidance control means comprises a potential computer which computes a potential based upon the predicted pattern.

8. A navigation apparatus as defined in claim 7, wherein said guidance control means comprises a matching force evaluator which evaluates a matching force to which the observed feature pattern is subjected by said potential.

* * * * *